(12) United States Patent
Doleac et al.

(10) Patent No.: US 9,357,870 B2
(45) Date of Patent: *Jun. 7, 2016

(54) CAPSULE, METHOD AND DEVICE FOR PREPARING A NUTRITIONAL PRODUCT

(75) Inventors: Frédéric Doleac, Vaux et Chantegrue (FR); Sophie Abraham, Malbuisson (FR); Yasmine Doudin, Vallorbe (CH); Yann Epars, Penthalaz (CH); Thierry Jean Robert Fabozzi, Geneva (CH); Heinz Wyss, Oberdiessbach (CH); Nicolas Bezet, Macon (FR); Lucio Scorrano, Yverdon-les-Bains (CH); Nihan Dogan, La Croix-sur-Lutry (CH); Alain Meier, Caneggio (CH)

(73) Assignee: Nestec S.A., Vevey (CH)

( * ) Notice: Subject to any disclaimer, the term of this patent is extended or adjusted under 35 U.S.C. 154(b) by 863 days.

This patent is subject to a terminal disclaimer.

(21) Appl. No.: 13/319,057

(22) PCT Filed: May 4, 2010

(86) PCT No.: PCT/EP2010/056002
§ 371 (c)(1),
(2), (4) Date: Nov. 4, 2011

(87) PCT Pub. No.: WO2010/128028
PCT Pub. Date: Nov. 11, 2010

(65) Prior Publication Data
US 2012/0052159 A1  Mar. 1, 2012

(30) Foreign Application Priority Data

May 5, 2009 (EP) .................................... 09159373
Jun. 11, 2009 (EP) .................................... 09162486

(51) Int. Cl.
*B65D 85/804* (2006.01)
*A47J 31/06* (2006.01)
(Continued)

(52) U.S. Cl.
CPC .......... *A47J 31/0668* (2013.01); *A47J 31/3695* (2013.01); *A47J 31/4467* (2013.01); *B65D 85/8043* (2013.01)

(58) Field of Classification Search
CPC ............ B65D 85/8043; B65D 85/804; B65D 2581/3409; A47J 31/3623; A47J 31/369; A47J 31/3676; A47J 31/368; A47J 31/0668; A47J 31/44671; A47J 31/3695; B65B 29/02; B65B 29/06
USPC .......................... 426/77, 78, 115; 99/295, 323
See application file for complete search history.

(56) References Cited

U.S. PATENT DOCUMENTS 663,271 A    12/1900  Hamilton
1,160,011 A * 11/1915  Swing ............................ 99/296
(Continued)

FOREIGN PATENT DOCUMENTS

CN    2036061 U    4/1989
CN    1826071 A    8/2006
(Continued)

OTHER PUBLICATIONS

"USDA National Nutrient Database," Apr. 3, 2009 http://web.archive.org/web/20090104004513/http://www.ars.usda.gov/Services/docs.htm?docid=10091  http://web.archive.org/web/20090403101002/http://www.nal.usda.gov/fnic/foodcomp/Data/SR18/reports/srl 8fg14.pdf.*
(Continued)

*Primary Examiner* — Viren Thakur
(74) *Attorney, Agent, or Firm* — K&L Gates LLP

(57) ABSTRACT

A capsule for the preparation of a nutritional product in a device adapted to supply liquid into the capsule. The capsule includes at least one compartment containing nutritional ingredients for the preparation of the nutritional product in combination with the supplied liquid, and a filter adapted for removing contaminants contained in the liquid. The capsule also has a selectively openable gas inlet which is placed on or in the capsule to allow gas introduction from outside the capsule into the compartment without passing through the filter.

16 Claims, 9 Drawing Sheets

(51) Int. Cl.
*A47J 31/36* (2006.01)
*A47J 31/44* (2006.01)

(56) References Cited

U.S. PATENT DOCUMENTS

| | | | |
|---|---|---|---|
| 3,312,368 A * | 4/1967 | Reynolds et al. | 220/359.2 |
| 3,730,353 A | 5/1973 | Trasen et al. | |
| 3,927,793 A * | 12/1975 | Langen | 220/266 |
| 4,027,582 A | 6/1977 | O'Connell | 99/306 |
| 4,136,202 A | 1/1979 | Favre | 426/77 |
| 4,500,426 A | 2/1985 | Ishii et al. | |
| 4,817,815 A * | 4/1989 | Stahlecker | 220/203.01 |
| 4,867,876 A | 9/1989 | Kopf | |
| 4,867,993 A * | 9/1989 | Nordskog | 426/77 |
| 5,011,555 A | 4/1991 | Sager | |
| 5,072,661 A * | 12/1991 | Kondo | 99/296 |
| 5,186,830 A | 2/1993 | Rait | |
| 5,429,742 A * | 7/1995 | Gutman et al. | 210/321.75 |
| 5,510,027 A * | 4/1996 | Tejeda | 210/282 |
| 5,681,468 A * | 10/1997 | Sawan et al. | 210/500.25 |
| 5,773,067 A * | 6/1998 | Freychet et al. | 426/506 |
| 6,103,116 A * | 8/2000 | Koslow et al. | 210/282 |
| 6,245,230 B1 | 6/2001 | Ricci | |
| 6,312,609 B1 * | 11/2001 | Solyanik et al. | 210/767 |
| 6,599,428 B1 | 7/2003 | Douglas | |
| 6,805,041 B2 | 10/2004 | Colston et al. | |
| 6,955,700 B2 | 10/2005 | Zia et al. | |
| 7,032,507 B2 | 4/2006 | Cai | 99/323 |
| 2001/0032822 A1 * | 10/2001 | Koslow et al. | 210/767 |
| 2002/0059870 A1 | 5/2002 | Walters, Jr. et al. | |
| 2004/0005384 A1 | 1/2004 | Cai | |
| 2004/0228955 A1 | 11/2004 | Denisart et al. | 426/590 |
| 2005/0150391 A1 * | 7/2005 | Schifferle | 99/295 |
| 2006/0236871 A1 * | 10/2006 | Ternite et al. | 99/295 |
| 2007/0000390 A1 | 1/2007 | Albrecht | 99/279 |
| 2007/0144355 A1 | 6/2007 | Denisart et al. | |
| 2007/0148290 A1 | 6/2007 | Ternite et al. | 426/90 |
| 2007/0186784 A1 * | 8/2007 | Liverani et al. | 99/295 |
| 2007/0199888 A1 | 8/2007 | Japp et al. | 210/474 |
| 2007/0259073 A1 | 11/2007 | Scarchilli et al. | |
| 2008/0035550 A1 | 2/2008 | Fecondini et al. | |
| 2008/0257165 A1 | 10/2008 | Bolzicco et al. | 99/295 |
| 2009/0004335 A1 | 1/2009 | MacMahon et al. | |
| 2009/0047389 A1 | 2/2009 | Jarisch et al. | 426/80 |
| 2009/0126578 A1 | 5/2009 | Amann et al. | |
| 2009/0155422 A1 | 6/2009 | Ozanne | 426/89 |
| 2010/0108541 A1 | 5/2010 | Roberto | |
| 2011/0003038 A1 * | 1/2011 | Colantonio et al. | 426/80 |
| 2012/0052163 A1 | 3/2012 | Doleac et al. | 426/112 |
| 2012/0052164 A1 | 3/2012 | Doleac et al. | 426/112 |

FOREIGN PATENT DOCUMENTS

| | | |
|---|---|---|
| CN | 2436167 Y | 6/2011 |
| DE | 102005058336 A1 | 6/2007 |
| EP | 1364605 A1 | 11/2003 |
| EP | 1 574 452 A2 | 9/2005 |
| EP | 1500358 B1 | 9/2006 |
| EP | 1 774 878 A1 | 4/2007 |
| EP | 1 826 148 A1 | 8/2007 |
| EP | 1 980 501 A1 | 10/2008 |
| EP | 1 982 933 A1 | 10/2008 |
| EP | 2082670 A1 | 7/2009 |
| EP | 2 236 437 A1 | 10/2010 |
| EP | 2244593 A1 | 11/2010 |
| EP | 2244743 A1 | 11/2010 |
| EP | 2285256 A1 | 2/2011 |
| EP | 2299851 A1 | 3/2011 |
| EP | 2194824 B1 | 9/2011 |
| EP | 2230973 B1 | 10/2011 |
| EP | 2427065 B1 | 12/2012 |
| JP | 06-315349 A | 11/1994 |
| WO | WO 01/51166 A1 | 7/2001 |
| WO | WO 2005/080223 A1 | 9/2005 |
| WO | WO2006043108 A1 | 4/2006 |
| WO | WO 2006/077259 A1 | 7/2006 |
| WO | WO2007125337 A1 | 11/2007 |
| WO | WO 2008/012314 A1 | 1/2008 |
| WO | WO2008078989 A1 | 7/2008 |
| WO | WO 2008/132571 A1 | 11/2008 |
| WO | WO 2008132571 A1 * | 11/2008 |
| WO | WO 2008/148834 A1 | 12/2008 |
| WO | WO2008146115 A1 | 12/2008 |
| WO | WO2008147195 A1 | 12/2008 |
| WO | WO 2008147195 A1 * | 12/2008 |
| WO | WO2009027131 A1 | 3/2009 |
| WO | WO 2009/092629 A1 | 7/2009 |
| WO | WO2009092628 A1 | 7/2009 |
| WO | WO2009092774 A1 | 7/2009 |
| WO | WO 2009/115475 A1 | 9/2009 |
| WO | WO2009135177 A1 | 11/2009 |
| WO | WO2010003878 A1 | 1/2010 |
| WO | WO2010128028 A1 | 11/2010 |

OTHER PUBLICATIONS

Definition of "inlet" and "merge." Websters New World Dictionary, Third College Edition. 1988 Simon & Schuster.*
Definition of "central" and "port," Webster's New World Dictionary, Third College Edition, 1988 Simon & Schuster.
U.S. Appl. No. 13/319,041, Non-Final Office Action, Mar. 20, 2014.
Definition of "micro" and "nozzle." Webster's New World Dictionary, Third College Edition. Simon & Schuster 1988.
"USDA National Nutrient Database" Apr. 3, 2009 http:/ /web. arch ive.org/web/20090 1 04004513/http :/ /www. ars.usda.gov/Services/ docs, htm?docid= 1 0091 http:l/web.archive.org/web/200904031 01 002/http://www. nal.usda.gov/fnic/foodcomp/Data/SR 18/reports/ sr18fg 14.pdf.
U.S. Appl. No. 13/319,041, Non Final Office Action, dated Sep. 12, 2013.
U.S. Appl. No. 13/318,981, Non Final Office Action, dated May 24, 2013.
International Search Report, EP2010056043, mailed Jul. 12, 2010.
International Search Report, EP2010056005, mailed Jul. 12, 2010.
International Search Report, PCT/EP2010/056002, mailed Jul. 12, 2010.

* cited by examiner

CAPSULE, METHOD AND DEVICE FOR PREPARING A NUTRITIONAL PRODUCT

This application is a 371 filing of International Patent Application PCT/EP2010/056002 filed May 4, 2010.

BACKGROUND

The present invention relates to a capsule for hygienically preparing a nutritional product containing nutritional ingredients by mixing the ingredients with a liquid; the capsule containing a filter for filtering the liquid supplied in the capsule for removing undesired components contained in the liquid. The invention more particularly relates to capsules for insertion in a device supplying liquid in the capsule for preparing a nutritional product by mixing with the nutritional ingredients such as an infant formula.

Nutritional compositions can be, for instance, infant formulas or also nutritional liquids for toddlers, invalids, elderly people, persons having nutritional deficiencies or athletes. Food compositions can be dairy-based liquids, soup, coffee or tea beverages. These compositions are prepared from ingredients contained in a capsule by addition of a liquid such as hot or ambient water. The liquid may contain undesired contaminants such as micro-organisms or solid particles. These undesired contaminants should be removed from the liquid before the liquid is mixed with the ingredients.

Therefore, there is a need for a capsule which enables preparation of nutritional composition for instance an infant formula or other food compositions in a convenient and safe manner.

WO2006/077259 discloses a method for preparing a single serving of a nutritional composition comprising introducing liquid such as water into a cartridge containing a unit dose of the composition in concentrated form. Thereby, the water is treated prior to the introduction into the cartridge in order to remove or kill pathogens from the water. This treatment may be for instance a pre-heating, a filtering or an irradiation of the water with ultra-violet light.

WO 2008/012314 relates to a device which teaches the principle of treating water by means of a filter used for the preparation of nutritional compositions from a capsule inserted in a dispenser.

A capsule with an integrated antimicrobial filter has been described in WO 2009/092629 and No. 09156782.6 filed on 31 Mar. 2009.

A problem is that the capsule may not empty completely from its content (combination of ingredients and supplied liquid). In particular, the liquid content can no longer evacuate when the supply of liquid in the capsule is stopped and the pressure in the capsule drops. In particular, the absence of air in the capsule and orifices for evacuation of the liquid content may be too small to allow emptying of the capsule. The incomplete delivery may have other causes, in particular, relative to a bad dissolution/dispersion of the ingredients in the liquid, the creation of a partial vacuum in the capsule which blocks or reduces considerably the flow out, insufficient opening of the capsule outlet, etc. If the capsule is insufficiently emptied, the nutritional dose is not properly delivered from the capsule and this may potentially cause nutritional and/or hydration issues.

Therefore, there is a need for ensuring the release of the dedicated amount of the nutritional composition contained in the capsule to ensure a complete feed for each capsule, e.g., to the baby or child. The problem is that the filter in the capsule can create a too high resistance to the pressurized gas (e.g., compressed air) injected in the capsule during the emptying operation. As a result, the pressure of gas can be insufficient to properly empty the capsule or a too high pressure of gas is required which has an impact on the complexity and cost of the system. Also if gas is forced under a too high pressure through the filter, the filter can be damaged and if so a contamination-free nutritional delivery from the capsule is no longer guaranteed.

There is also a need to ensure an hygienic contact between the device and the capsule after filtering liquid, in particular, during emptying it.

SUMMARY OF THE INVENTION

For this, the invention relates to a capsule for the preparation of a nutritional product in a device adapted to supply liquid in the capsule, said capsule comprising:

at least one compartment containing nutritional ingredients for the preparation of the nutritional product in combination with the supplied liquid, a filter adapted for removing contaminants contained in the liquid, wherein it comprises a selectively openable gas inlet which is placed on or in the capsule to allow gas introduction from outside the capsule into the compartment without passing through the filter.

As a result of such configuration, the capsule can be emptied by the pressure of gas supplied in the compartment through the gas inlet. At the same time, the gas bypasses the filter so that the pressure of gas is not excessively reduced by the filter. As a result, the capsule can be correctly emptied from the nutritional liquid.

More particularly, the gas inlet has a defined size in open configuration and is provided in a rigid wall of the capsule.

The gas inlet is preferably sealed by a puncturable membrane or comprises a breakable closing portion. The puncturable membrane can be an aluminium foil, a plastic foil comprising a gas barrier or a combination thereof. For example, a breakable closing portion can be a weakening plastic tab hermetically closing a gas orifice.

An outlet nozzle is preferably disposed downstream of the filter and in communication with the compartment. The nozzle may comprise one or more small opening. The openings are configured to provide a jet of liquid of high velocity in the compartment that promotes dissolution of the ingredient in contact with the liquid.

Furthermore, the possible contact when opening the gas inlet remains with filtered liquid thereby maintaining the contact parts of the external device, e.g., opening means, sufficiently clean.

Preferably, the gas inlet merges with a liquid conduit placed downstream of the filter and communicating with the compartment. Indeed, a rationalized configuration is to have the gas inlet communicate with the liquid conduit so to avoid complexity and provide a more compact design. Preferably, the conduit is placed upstream an outlet nozzle communicating with the compartment.

However, in an alternative, the gas inlet can be placed away from the conduit and communicates directly in the compartment without merging with the liquid conduit. For example, the gas inlet communicates with the compartment by a conduit which is separate, e.g., such as running in parallel, from the liquid conduit. For example, the gas inlet is an indentation, recess or opening formed in the flange-like rim of the capsule and is preferably closed by a perforable or breakable membrane.

In the preferred mode, the filter is formed as a relatively rigid filter unit comprising a flexible microporous membrane encased in relatively rigid casing. The unit is also preferably a pressure resistant and easy to handle. Hence, the casing protects the membrane against the shocks, pressure, scratching, bending, etc., both during manufacturing of the capsule and during beverage preparation. The casing can be formed of two half-casings which are welded together and pinch and/or weld the filter at its circumference. These elements can be associated by clipping and/or ultrasonic welding. These elements are sufficiently rigid to resist bending under the pressure of liquid injected in the capsule. These elements are made of foodgrade polymer such as PP, PA, PE, PA/PP, PVC, PS, PEEK, PLA, starch-based material and combinations thereof.

The filter unit has preferably a filtering surface, viewed in the projection along the axial direction of the capsule, which is smaller than the cross section of the compartment containing the ingredients. The compactness of the filter unit enables to place the unit substantially out of the compartment of the capsule thereby reducing its deformation and better handling the pressure exerted by the external liquid supply device. Furthermore, less packaging and filtering material is advantageously used.

For an easier assembling of the capsule, in particular, of the filter unit in the capsule, the capsule comprises a body delimiting the first compartment which comprises a filter-receiving seat placed upstream of the compartment. The filter-receiving seat serves for lodging the filter unit, preferably, in a predetermined position in the capsule.

In order to advantageously reduce the number of elements to form the capsule so to reduce its complexity, the first compartment and filter unit are also preferably both closed and sealed by a same top membrane.

The nutritional ingredients contained in the compartment can be under the form of a liquid concentrate, paste, gel, powder and combinations thereof.

The nutritional ingredients preferably comprises an infant formula, growing-up formula, gums, adult nutrition formula, a dairy based ingredients, a culinary composition or any other suitable nutritional food including proteins, lipids, carbohydrates, micronutrients, fibres and combinations thereof.

The present invention also relates to a method for delivering a nutritional composition from a capsule containing ingredients in et least one compartment of said capsule by supplying a liquid in the compartment to form the composition with the ingredients and release the composition through the capsule wherein it comprises filtering the liquid through a filter to remove contaminants contained in the liquid and subsequently supplying a gas in the capsule.

According to the method of the invention, gas is supplied in the compartment from the exterior of the capsule through a conduit communicating with the compartment without passing through the filter.

More preferably, the gas is supplied from a gas inlet located upstream of an outlet nozzle communicating with the compartment. The outlet nozzle may serve for passage of the injected liquid in the compartment. The outlet nozzle forces liquid to enter the compartment at a high velocity for intimately mixing with the ingredient. The outlet nozzle may thereby serve for supplying gas in the compartment.

In an alternative, the nozzle may be a nozzle dedicated only for supplying gas in the compartment. Gas is preferably introduced via a gas injector of the device which is introduced in or through the gas inlet. As gas is introduced upstream the compartment and downstream of the filter, there is a reduced risk of contamination of the gas injector with nutritional liquid. Indeed, the gas injector comes only in contact with filtered liquid, i.e., purified liquid, and there is also a lower risk of backflow of nutritional liquid via the outlet nozzle.

Preferably, in the method of the invention, the supply of gas is carried out at least until the capsule is emptied from liquid. The full emptying of solids depends on the dissolution of the ingredient in the capsule and may vary. If all solids are dissolved properly in the supplied liquid, the full capsule's content can be emptied correctly by gas flushing.

The method may encompass a next operation of compressing the capsule so as to reduce its size when there is substantially no more liquid in the capsule.

In particular, the compression may be activated mechanically by a piston or a compressing jaw of the fluid supply device acting on the capsule to reduce the size of the ingredients compartment.

The invention also relates to a device for supplying liquid in a capsule for preparation of a nutritional composition; said device comprising a liquid injector for providing liquid in the capsule, wherein it comprises a gas injector for injecting gas in the capsule which is distinct and spatially distant from the liquid injector so that gas is supplied in the capsule through a gas inlet of the capsule which is spatially distant from the liquid inlet of the capsule.

In possible mode of the device, the device comprises means for controlling the opening of the gas inlet to be effected after the opening of the liquid inlet. Such control means of the gas and liquid inlets can be obtained by cam means selectively acting on the liquid injector then on the gas injector in a deferred operation. In particular, the cam means may comprise a first portion of cam acting on the liquid injector and a second portion of cam acting on the gas injector.

In an alternative, the control means can also be separate actuators which drive mechanically and/or hydraulically the injectors in an independent but coordinated manner. The operation of driving the injectors can be controlled by an electronic controller which activates the liquid and gas actuators sequentially during the cycle of preparation of the nutritional product.

In a preferred manner, the liquid injector comprises at least one perforating element and a conduit for supplying liquid from a liquid supply into the capsule via the liquid inlet.

The gas injector also comprises at least one perforating element, distinct from the perforating element of the liquid injector, and a gas conduit for supplying gas from a gas supply into the capsule via the gas inlet.

The gas supply may be a reserve or pressurized gas or a pressurized gas generating means such as an air pump.

BRIEF DESCRIPTION OF THE DRAWINGS

The appended drawings are given as a matter of illustration of the best modes.

DETAILED DESCRIPTION OF THE INVENTION

Figure 1:
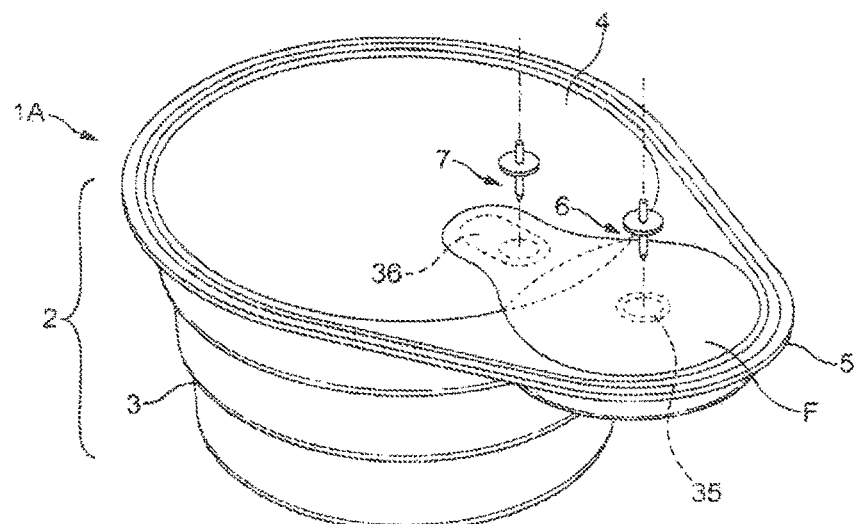
FIG. 1 is a perspective top view of a capsule according to preferred mode of the invention.
Figure 2:
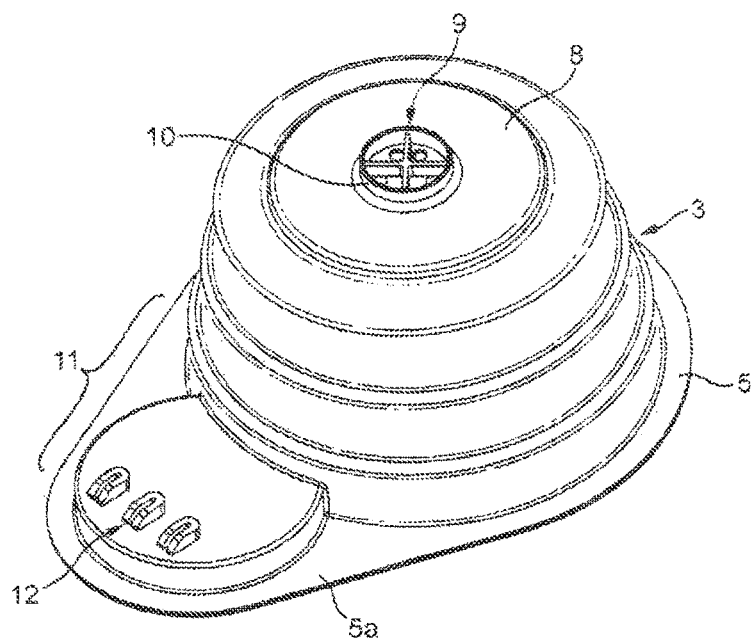
FIG. 2 is a perspective bottom view of the capsule of FIG. 1.
Figure 3:
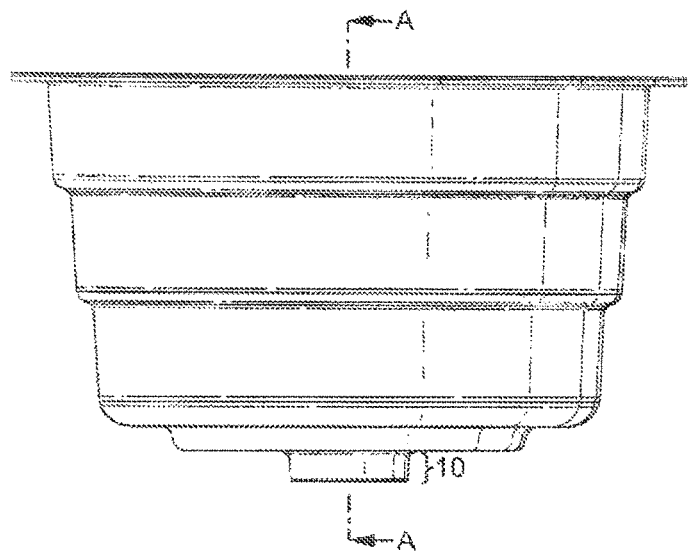
FIG. 3 is a side view of the capsule of FIG. 1.

The general aspect of the capsule according to a first mode of the invention is illustrated in connection with FIGS. 1 to 3 given as a preferred example only. The capsule 1A generally comprises a body 2 for receiving nutritional ingredients, a filter technology and a product delivery technology as will be discussed later on. The capsule has a cup 3 formed in the body which is closed by a liquid impermeable top membrane or foil 4 which is sealed onto the flange like rim 5 of the body. The membrane 4 may be simply liquid impervious or, most preferably, liquid and gas impervious. In particular, the membrane can be a multilayer comprising a gas barrier such as EVOH and/or aluminium. As will be explained in more detail later on, the top membrane is made of a puncturable material such as thin polymer and/or aluminium to enable liquid to be supplied by means of a liquid injector 6 on one hand, and gas to be supplied in the capsule by means of a gas injector 7 on the other hand.

The bottom 8 of the cup 3 comprises a product outlet 9 intended for the release of the liquid nutritional composition/product from the capsule. The product outlet 9 may comprise one or several openings for streaming of the liquid composition towards a receptacle such as a baby bottle, glass or cup. The product outlet 9 may extend from the cup bottom by a short duct 10 for directing the flow of liquid and reducing side projections of liquid which could contaminate the surroundings of the receptacle.

The body of the capsule extends on the upper side by an extension portion 11 which receives the filter for filtering liquid supplied to the capsule. Extension portion 11 includes a portion 5a of flange-like rim 5. As illustrated on FIG. 2, the capsule may further comprises a three-dimensional coding structure 12 capable of co-acting with positioning sensors of the liquid supply device, for discriminating the type of the capsule inserted in the device so that the preparation cycle may be tailored to the recognized capsule type, e.g., by supplying the proper volume of liquid, varying temperature, flow rate, etc.

Figure 4:
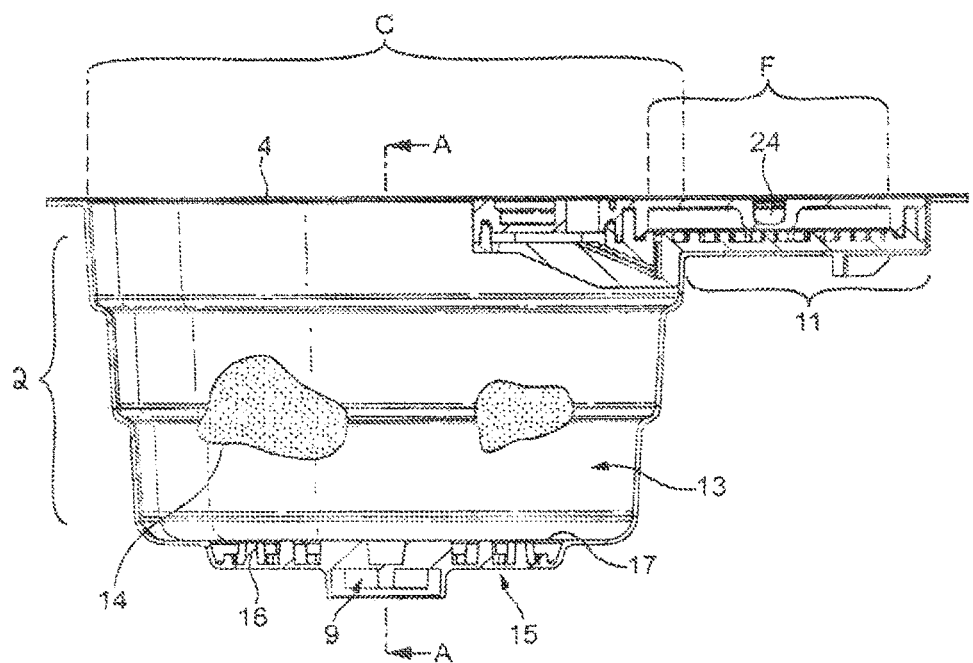
FIG. 4 is cross section of the capsule of FIG. 3 along line A.
Figure 5:
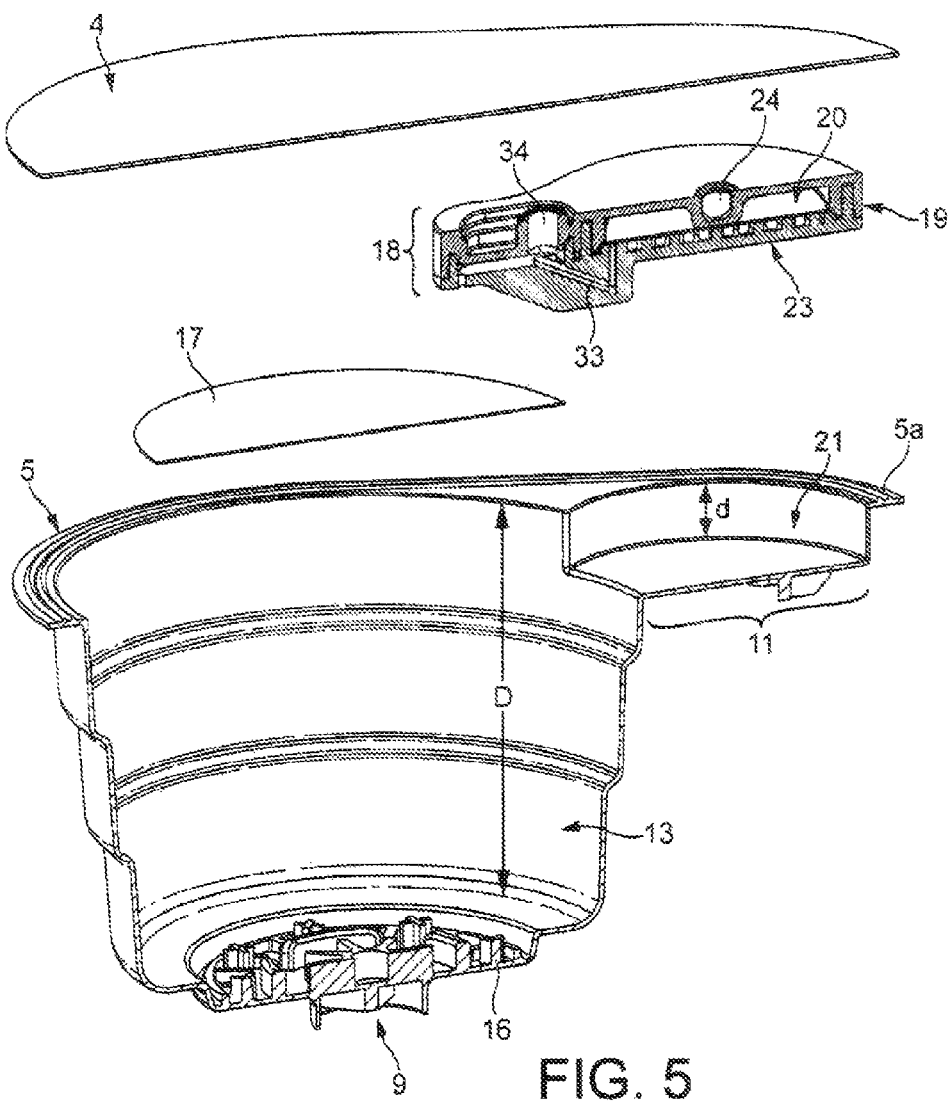
FIG. 5 is an exploded cross sectional view of the capsule of FIG. 1 showing the different elements before assembly.
Figure 6:
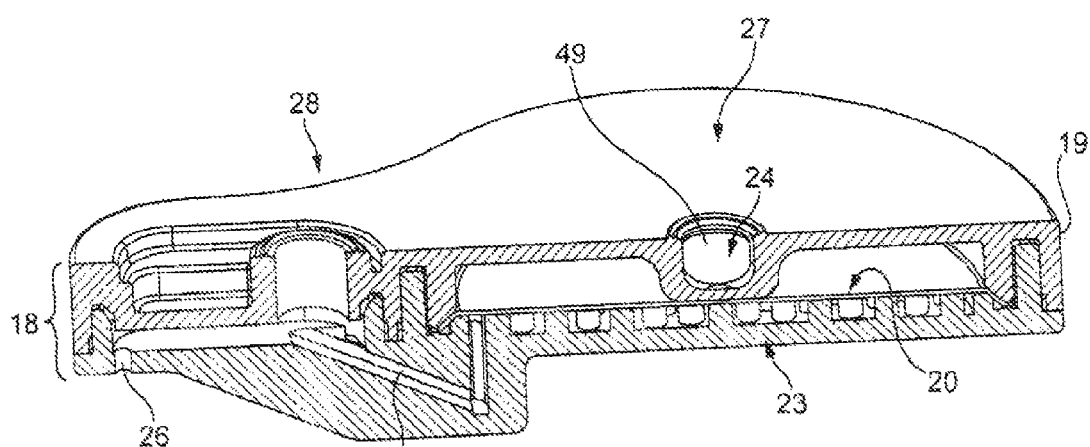
FIG. 6 is an enlarged perspective and cross sectional view of the filter unit of the capsule of FIG. 1.

In view of FIGS. 4 and 5, the capsule comprises, in the cup, a compartment 13 containing nutritional ingredients 14 formed by the bottom and sidewall of the cup 3. The volume of the compartment may vary depending on the volume of liquid to be injected in. In general, a large volume is preferred for large volume of liquid so that the compartment serves as a mixing bowl for the ingredients and liquid to form the composition.

The capsule may comprise a product delivery system 15 for ensuring a proper interaction of the supplied liquid and the ingredients contained in the compartment of the capsule and for reducing, preferably avoiding contact of nutritional liquid with the device. In a particular mode, the product delivery system is designed to open at least one orifice through the capsule for delivery of the composition when a sufficient pressure of liquid has been reached in the compartment. For this, the bottom 8 of the cup comprises perforating elements 16 strategically placed to perforate a lower membrane 17 normally separating the compartment 13 from the liquid product outlet 9. The lower membrane is typically a thin liquid-tight perforable membrane made of aluminium and/or polymer. The membrane is sealed at the bottom edge of the cup. For instance, the membrane is a 30-micron foil of aluminium. A capsule comprising such a product delivery system is described in PCT/EP09/053,033 filed on 16 Mar. 2009 which is incorporated here by reference. It should be noted that the product delivery system can be designed differently. For instance, it can be a simple valve comprising an orifice or slot normally closed and which opens under the pressure which builds in the compartment as resulting from the liquid being supplied in. In another alternative, it can also be a porous wall forming a product filter.

The capsule of the invention is further designed to ensure filtration of the liquid being supplied in the compartment. The rationale for filtration of incoming liquid is essentially linked to the requirement for controlling a perfect quality of the liquid, e.g., water, entering in the delivered composition. Water can be supplied at a temperature of service, e.g., at about 35-40 degrees Celsius, by heating of ambient water coming from a water tank of the fluid supply device. More preferably, the filtration is carried out to remove contaminants including microorganisms such as bacteria, yeast or molds and eventually viruses, e.g., which have not been destroyed by the water heating operation. For this, a solution can consists in inserting, in a predetermined area of the capsule, a filter unit 18 in the form of a pressure resistant, handleable unit comprising an outer protective casing 19 and at least one filter media, in particular, a filter membrane 20. The filter unit 18 is preferably rigid in the sense that it is more rigid than the filter membrane and preferably, it is also resistant to significant deflection upon application of the liquid and sealing pressure exerted by the liquid coming out of the injector and by the sealing engagement of the fluid supply device itself onto the capsule. The filter unit presents the advantage to facilitate the placing of the filter technology in the capsule, without requiring specific connection means, and it reduces the risk of damaging the filter membrane.

For antimicrobial purpose, the filter membrane has preferably a pore size of less than 0.4 microns, most preferably of less than 0.2 microns. It may have a thickness of less than 500 microns, preferably between 10 and 300 microns. The material of the membrane can be chosen from the list consisting of PES (polyethersulfone), cellulose acetate, cellulose nitrate, polyamide and combinations thereof.

In particular, the filter unit is insertable in a filter receiving seat 21 formed at the extension portion 11 of the body. The filter receiving seat is so designed to position the filter unit in an offcentred manner relative to the compartment. As a result, the deformation of the capsule due to the pressure of liquid and the sealing with the device can be reduced compared to a more central positioning above the compartment. The filter receiving seat 21 may be, for instance, a U-shaped cavity of relatively low depth (d) compared to the depth (D) of the compartment. The seat 21 has a bottom wall and a sidewall matching at least part of the bottom and sidewall of the filter unit, in particular, of its larger portion 27. The filter unit may not require any specific connection with the filter receiving seat but it is simply maintained in place by the complementary shapes of the unit, e.g., by press-fitting, in the seat and the closure obtained by the top membrane 4. For instance, the seat 21 may comprise corrugations or recesses in its sidewall, e.g., near the compartment, for receiving the filter unit by press-fitting (not shown).

As illustrated in FIG. 4, the filter unit 18 is sized so that its filtering surface (F) is at least two times, preferably several times smaller than the larger cross section (C) of the mouth (i.e., upper opening) of the compartment 13, e.g., corresponding to the upper opening of compartment. Furthermore, the largest portion of filtering surface (F) is axially offset relative to the cross section (C) of the compartment (13) when the capsule is viewed in projection view along axial line A. By "largest portion", it is meant that at least 60%, preferably 85% of the filtering surface is placed outside the cross section of the compartment in the projection along direction A. The filtering surface is here considered as the total surface of the filter membrane minus its pinched circumference 30. A certain overlap of the surfaces may be considered as acceptable. A first problem solved is the reduction of the compartment and the ability to better control the deformation of the filter. Another problem solved is about the reduction of the amount of material for the filter membrane and consequently the reduction of the manufacturing cost and the impact of the used capsule on environment. Another advantage is the possibility to compress the capsule, in particular, the cup of the capsule after emptying for reducing the storage volume of the used capsules. For this, the capsule may be provided with a sidewall including weakened lines oriented in such as way to promote compression of the cup in the axial direction.

As illustrated in FIGS. 6 to 9, the filter unit of the invention comprises an inlet wall 22 for introduction of liquid in the unit and an outlet wall 23 for delivery of filtered liquid in the compartment 13. The inlet wall comprises a liquid inlet 24 whereas the outlet wall comprises a liquid outlet 25 formed at a nozzle 26 of the unit. The liquid inlet and outlets 24, 25 are spaced apart in the axial direction so that liquid inlet 24 is placed outside the contour of the compartment 13 whereas the outlet 25 is placed inside the contour of the compartment. As a matter of preferred design, the filter casing can take the form of a racket with a larger portion 27 positioned in the seat and extending by a narrowing portion 28 of nozzle which extends transversally above the compartment. The outlet 25 preferably has a small diameter, e.g., between 0.2 and than 1.5 mm, to form a jet of liquid under pressure that promotes dissolution and/or dispersion of the ingredients by liquid projected through the nozzle. The outlet may be formed of several discrete openings. The number of openings should be small, preferably between 1 and 5 at maximum to avoid a too large reduction of the flow velocity. In a mode, two parallel or non-parallel outlets are provided in the nozzle. The flow velocity through the outlet(s) of the nozzle is preferably comprised between 1 and 20 msec. The outlet can have different cross section such as circular, oval, rectangular, etc.

The casing encloses the filter membrane 20 in an inner compartment 29 forming an upstream side and downstream side with the circumference 30 of the filter being sealed by the casing in a liquid-tight manner so to avoid bypass of the filter by liquid. At the downstream side of the compartment, the filter membrane is further supported by a support structure formed, e.g., of a multitude of small studs 31. The studs have flat free ends to reduce axial deflection of the filter membrane under pressure and avoid its breakage. The studs are preferably formed along the whole cross section of the filter membrane. More preferably, adjacent studs are not distanced of more than 2.5 mm. Between the support structure is formed a multitude of channels 32 for collecting the liquid being filtered through the membrane. The outlet wall 23 comprises at least one outlet conduit 33 for making fluid communication between the downstream side of the filter membrane, via channels 32, and the outlet 25 of nozzle 26. The support structure can be a separate element, e.g., a grid placed in the casing below the filter.

At the inlet wall 22, the filter unit further comprises a gas inlet 34 for enabling supply of gas under pressure, e.g., compressed air, in the compartment 13. The gas inlet can be, as illustrated, an opening through the wall intersecting with the outlet conduit 33. Therefore, it should be noted that gas entering the unit will bypass the filter membrane 20 on its way to the nozzle 26 and will enter under pressure the compartment. Both the liquid inlet 24 and the gas inlet 34 are closed by the top membrane 4. Hence, the inlets are selectively openable by perforating the membrane 4 at the dedicated inlets. In particular, the top membrane 4 is sealed around the liquid inlet and gas inlet by seals 35, 36 (FIG. 1). Therefore, when the top membrane is perforated by the gas injector 7 of the fluid supply device, the tip of the perforator can only enter in contact with filtered liquid. As a result, there is a much lower chance of contamination of the perforator than if the gas and liquid inlet were the same entry. The gas perforator can so remain clean for the next preparation cycle.

Figure 7:
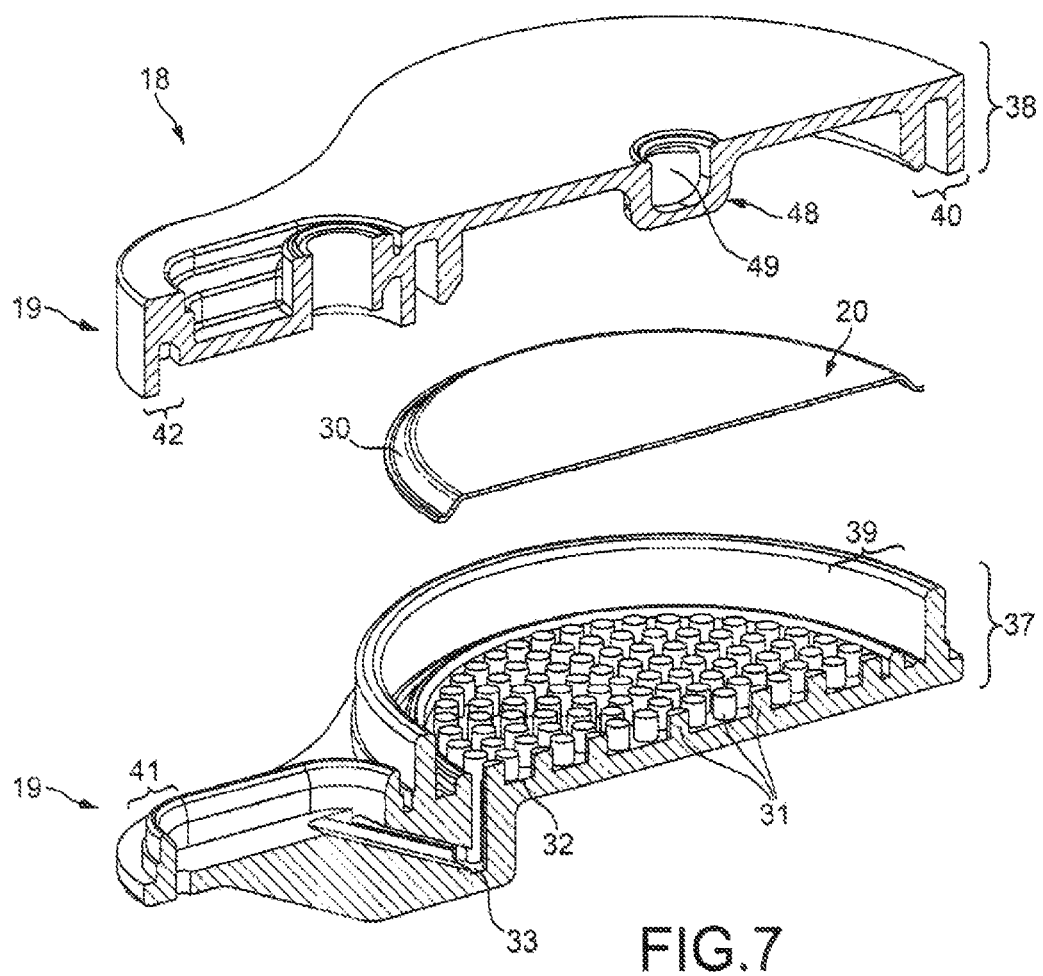
FIG. 7 is an exploded view of the filter unit of FIG. 6.

The structure of the filter casing 19 can vary. However, in a preferred design, the casing is formed of two parts 37, 38 which are welded and/or clipped together. FIG. 7 shows the filter unit 18 with a lower half casing 37 and an upper half casing 38. The lower half casing 37 has a protruding circular ridge/groove section 39 which delimits the contour of the inner compartment for fitting in a circular groove/ridge section 40 of the upper half casing 38. Similarly, the narrowing portion 28 of the unit is assembled by a second ridge/recess section 41 in the lower half casing that fits into a groove/ridge section 42 of the upper half casing 38. It could be as well that sections 39, 41, respectively 40, 42 form continuous sections from the larger portion 27 of the racket to the narrowing portion 28 of the racket.

Figure 10:
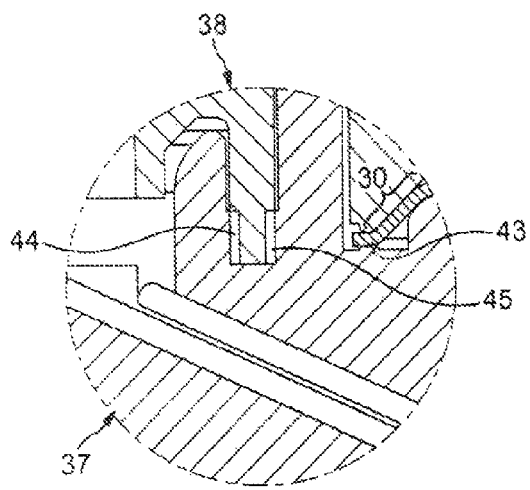
FIG. 10 is a detail in cross section of the welded assembly of the filter unit of FIG. 6.
Figure 11:
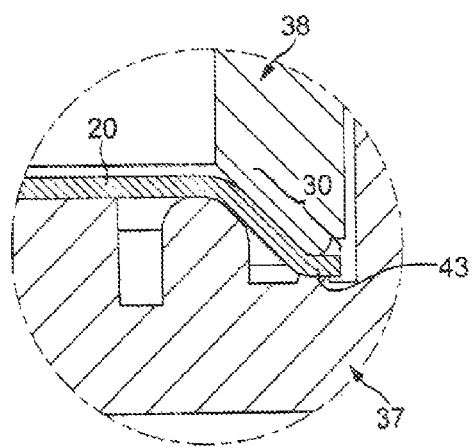
FIG. 11 is another detail in cross section of the filter membrane connection in the casing of the filter unit.

As illustrated in FIGS. 10 and 11, the lower and upper half casings 37, 38 are assembled while pinching the circumference 30 of the filter membrane. The parts 37, 38 can be designed in such a way to bend the circumference and pinch it at a circular point 43. The filter might not be necessary welded to the casing if the pinch point is sufficient to maintain the filter firmly in place and therefore successfully avoid bypass effect during operation. The unit can thus be assembled by welding at the groove/ridge sections by suitable welding lines 44, 45 for instance. The benefit of welding the casing parts but pinching the filter resides in the possibility to choose amongst a larger material choice for the filter without having to care for welding compatibility with the material of the casing. Another benefit is to simplify assembly by using ultrasonic welding for the thicker elements of the unit and avoid damaging the thinner element (i.e., filter membrane).

Figure 8:
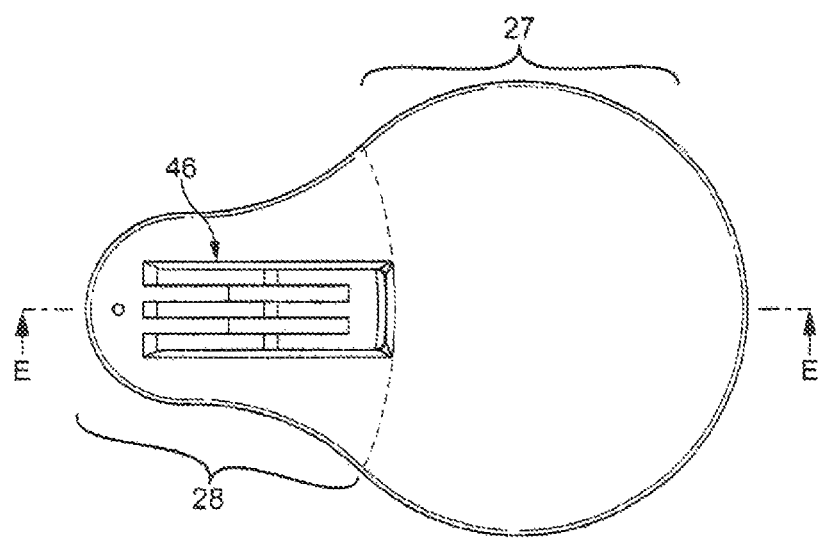
FIG. 8 is a bottom plane view of the filter unit of FIG. 6.
Figure 9:
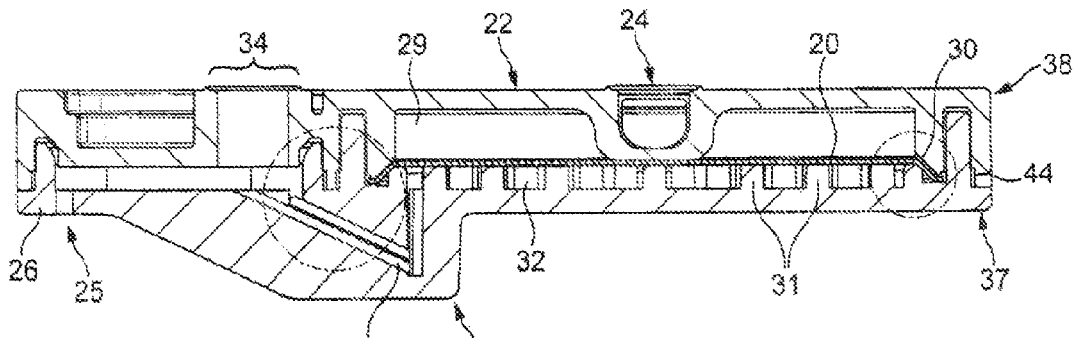
FIG. 9 is an enlarged plane cross sectional view of the filter unit of FIG. 8 along line E.

As shown in FIG. 8, the structure of the filter unit may be optimized. For example, the filter unit can comprise a reinforcing structure 46, in particular, at the narrowing portion 28 to enable the conduit to be formed in the lower wall but while still maintaining rigidity of the unit, in particular, in view of fluidic and/mechanical constraints. For instance, the reinforcing structure forms a series of ribs extending, for instance, in the transversal direction of the racket. Of course, many different reinforcing patterns are possible. In particular, the ratio rigidity-to-weight should be optimized to promote cost reduction and lower impact on environment.

Figure 12:
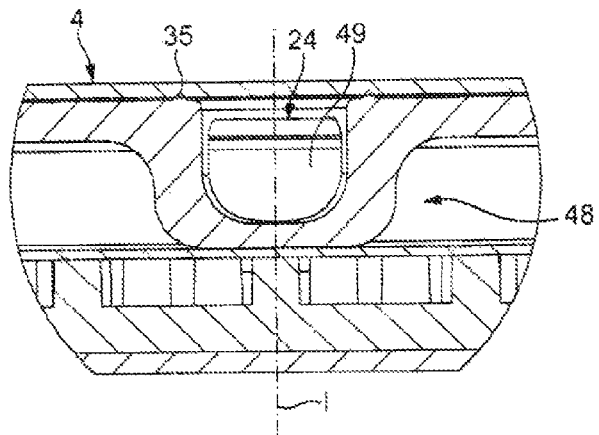
FIG. 12 shows another detail in cross section of the inlet of the filter unit.

In order to reduce the risk of damaging the filter membrane during opening of the liquid inlet 24 when perforating the membrane 4 in the area 47 just above the inlet, as illustrated in FIG. 12, a perforation-resistant deflector 48 is provided between the inlet and the filter membrane 20. The deflector 48 can be made integral with the inlet wall of the casing. It can be designed as a transversal bridge crossing the inlet opening and inset relative to the opening. Therefore liquid may pass by side passages 49 formed in the inlet between the bridge and the wall. Of course, the deflector could take various forms provided it creates a protection against perforation along inlet axial direction I. The deflector could also be a separate piece interposed between the filter and the inlet wall.

Figure 13:
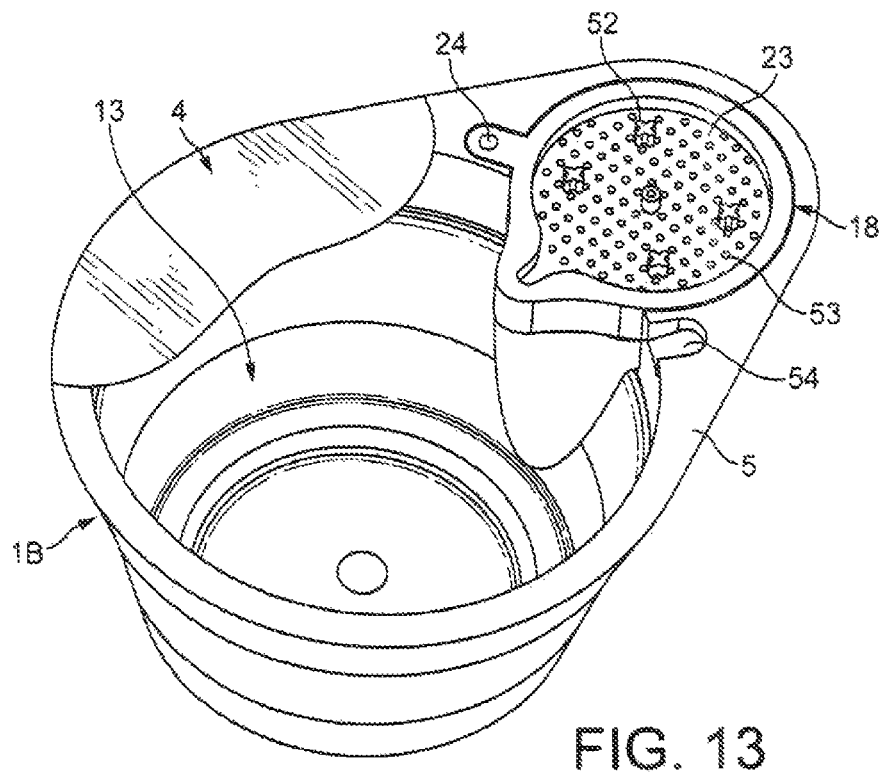
FIG. 13 shows, in top perspective view, a second embodiment of the capsule of the present invention with the top membrane being removed for clarity.
Figure 14:
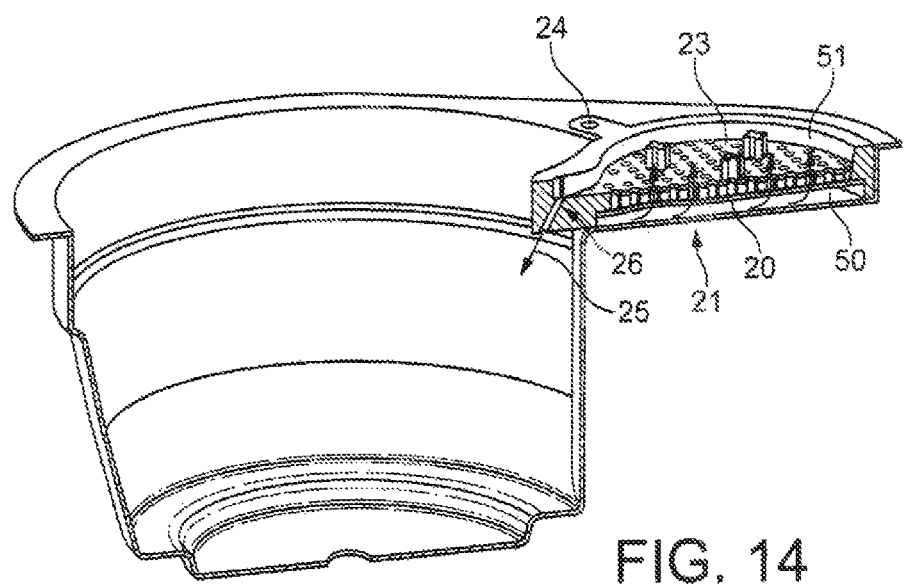
FIG. 14 shows in cross section perspective view the capsule of FIG. 13.
Figure 15:
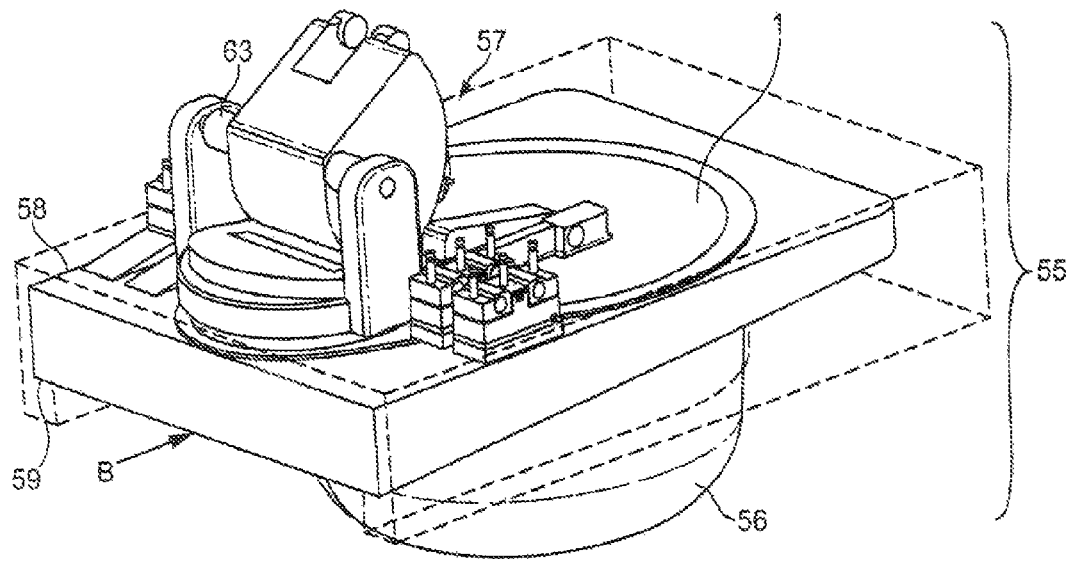
FIG. 15 shows a perspective view of a fluid supply device of the invention in which is inserted a capsule of the invention before opening of the liquid inlet for supply of liquid in the capsule.
Figure 16:
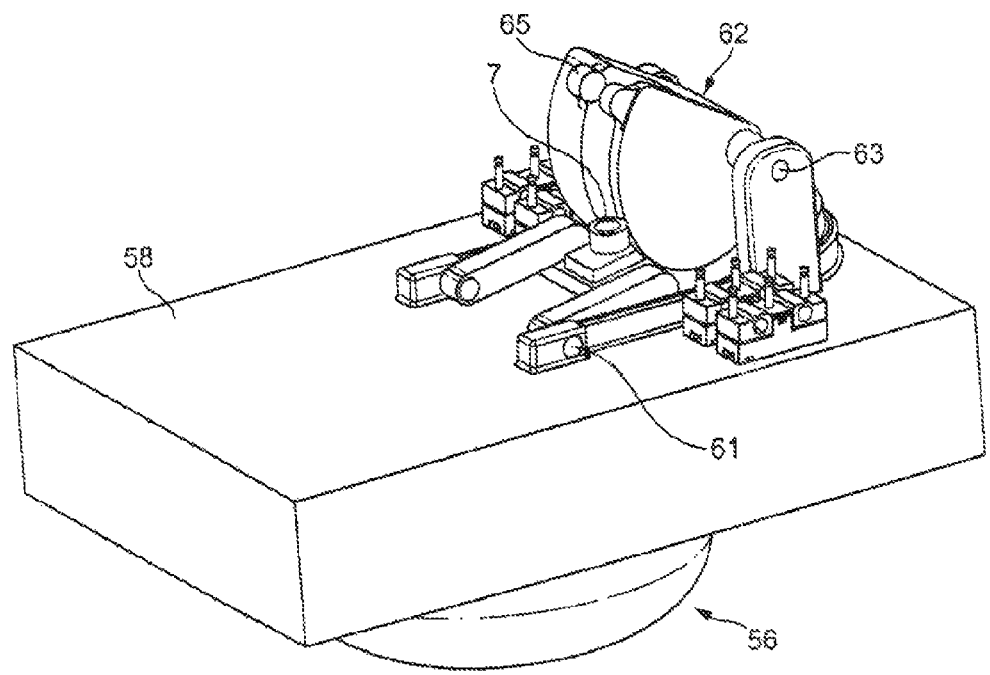
FIG. 16 shows a perspective view from a different angle of the fluid supply device of the invention still before opening of the liquid inlet.

In another embodiment illustrated in FIGS. 13 and 14, the capsule 1B of the invention differs in different aspects. First of all, a filter unit 18 is provided which comprises an outlet wall 23 onto which is applied the filter membrane 20. Contrary to the previous embodiment, the filter membrane 20 is placed between the outlet wall 23 and the bottom of the filter receiving seat 21 of the body. A liquid inlet 24 is provided on the side of the unit which communicates with the lower compartment 50 placed upstream of the filter but below the outlet wall 23. A second upper compartment 51 is formed between the outlet wall 23 and the top membrane (not shown) 4 which is sealed on the flange-like rim 5 of the body of the capsule. In order to avoid the top membrane 4 from collapsing in the upper compartment 51 and partially blocking the flow coming out of the filter membrane, the outlet wall 23 of the filter is provided with several support elements 52. The outlet wall is further provided with a multitude of openings 53 for allowing filtered liquid to properly distribute through the filter membrane placed upstream. Therefore, the liquid supplied in the capsule through liquid inlet 24 flows under the unit in the lower compartment 50 then through the filter membrane 20 in the upward direction. The filtered liquid is thus collected in the upper compartment and flows through the outlet nozzle 26 comprising a small-size outlet 25. For emptying capsule 1B, a gas inlet can be provided independently from the filter unit. In particular, an indentation 54 can be formed in the flange like rim, e.g., beside the filter unit. For gas to be supplied in the ingredients compartment 13, the top membrane is perforated at the site of the indentation. Perforation of the membrane can be carried out by a mechanical element of the fluid supply device or by gas under pressure. Of course, the gas inlet could also be provided in the filter unit. The product delivery system can be the same as described in the first mode.

The description will now be focused, in relation to FIGS. 15 to 20, on the fluid supply device according to the invention adapted for receiving a capsule for preparation of a nutritional composition as described.

The fluid supply device 55 of the invention typically comprises a capsule holder 56 adapted in size to receive the capsule 1. The capsule holder fits with a fluid supply group 57 comprising liquid and gas supply means. The fluid supply group 57 comprises a capsule holder insertion base 58 for offering a stable position of reference for the capsule holder. In particular, complementary guiding means 59 on the capsule holder 56 and base 58 are provided for enabling easy assembling and removal of the capsule holder from the base such as along a longitudinal sliding direction B.

It should be noted that the filter unit 18 of the invention could as well be a separate part which is associated with the capsule at the time of use, e.g., during insertion of the capsule in the fluid supply device. For instance, the filter unit can be part which is associated to the liquid injector or integrated in the liquid injector.

Figure 17:
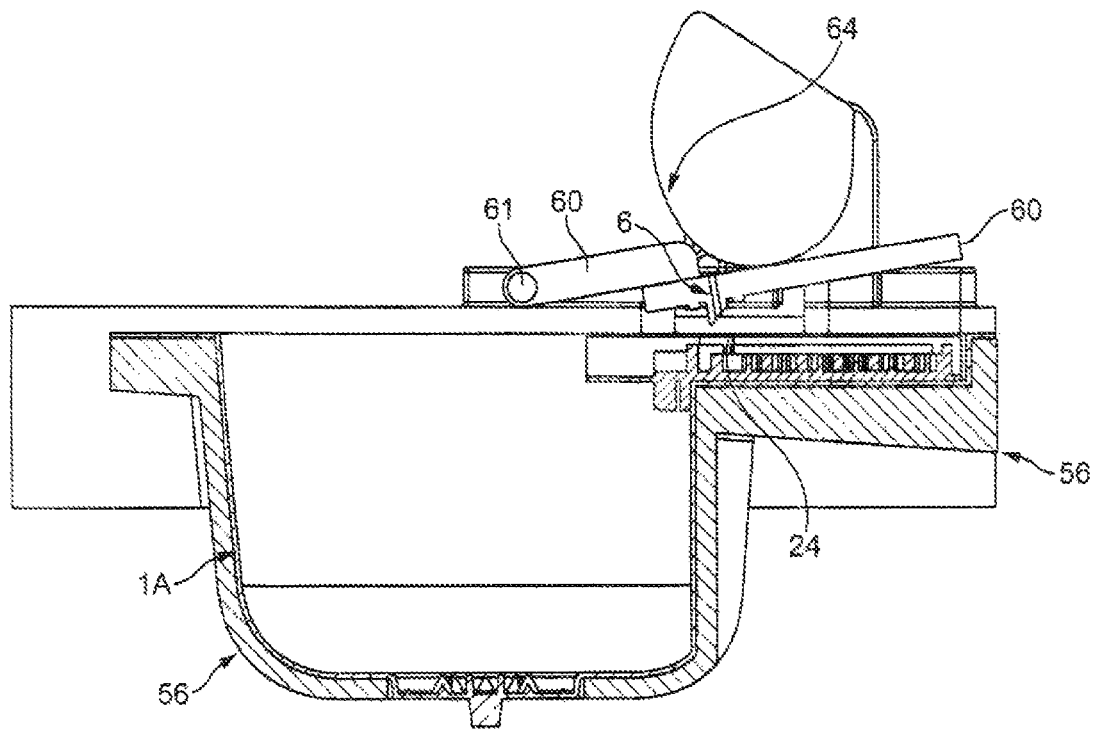
FIG. 17 is a cross sectional view of the device of FIG. 15 along a plane passing through the liquid injector still before opening of the liquid inlet.
Figure 18:
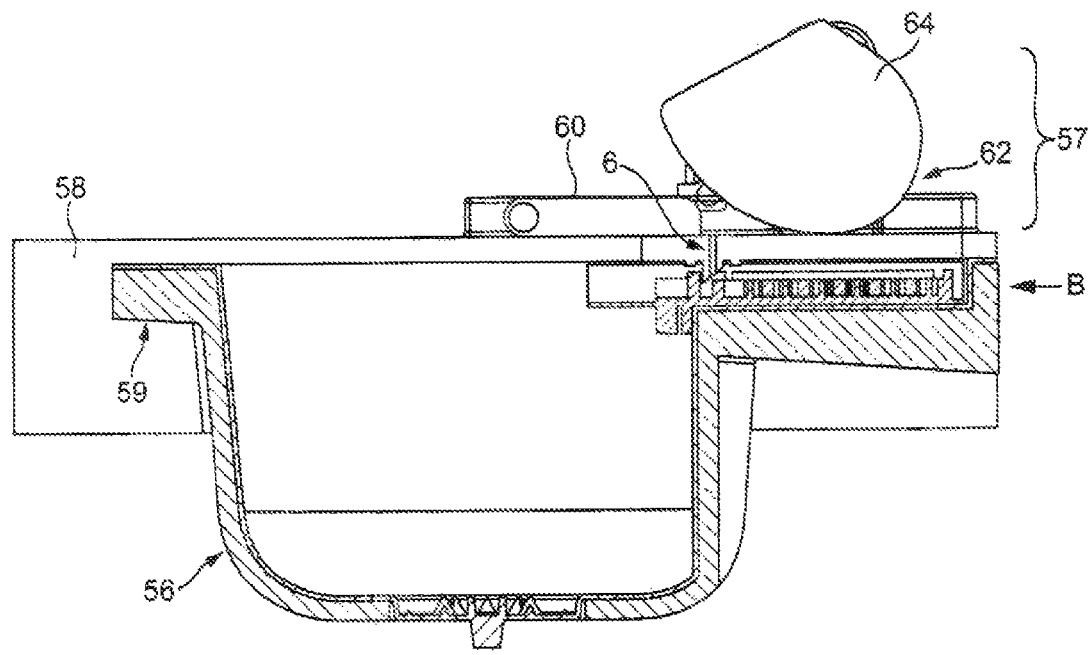
FIG. 18 is a cross sectional view of the device of FIG. 15 along a plane passing through the liquid injector still after opening of the liquid inlet.
Figure 19:
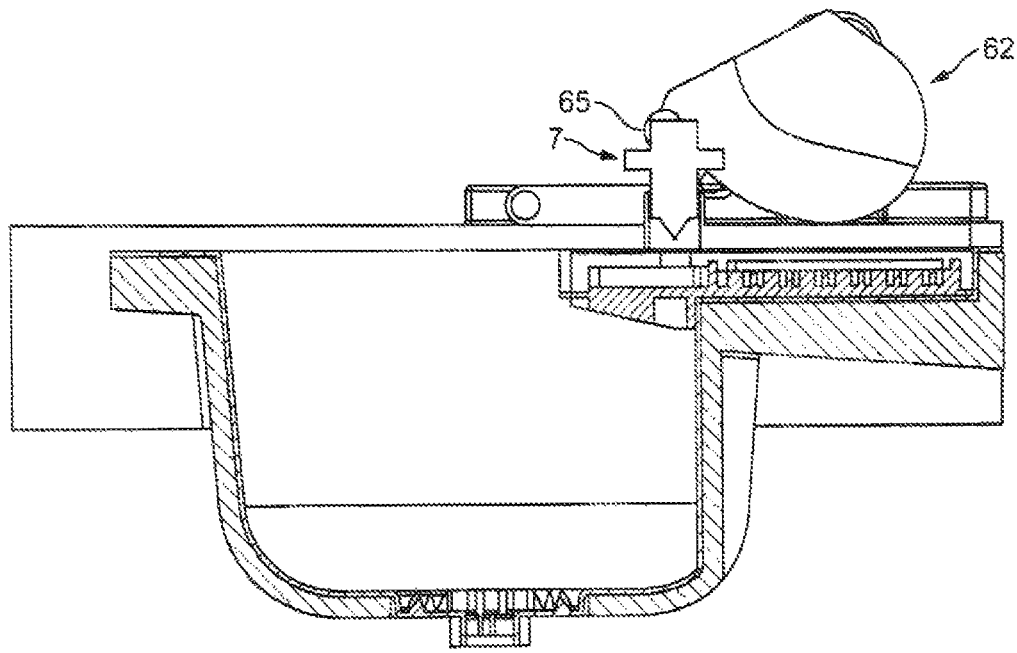
FIG. 19 is a cross sectional view of the device of FIG. 15 along a plane passing through the gas injector before opening of the gas inlet.
Figure 20:
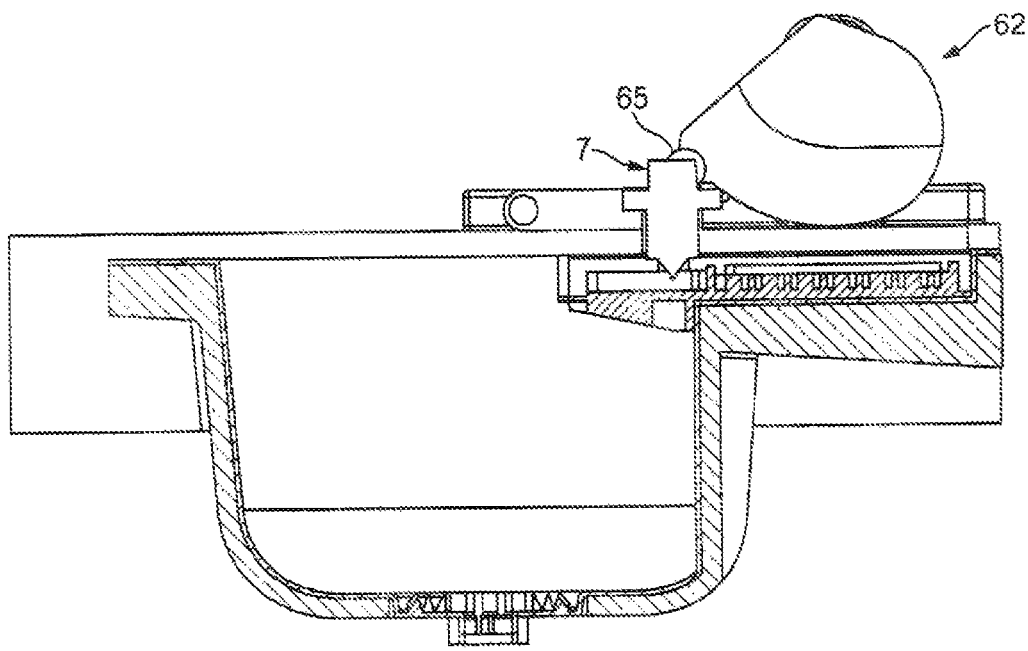
FIG. 20 is a cross sectional view of the device of FIG. 15 along a plane passing through the gas injector after opening of the gas inlet.

The fluid supply group 57 further comprises a liquid injection plate 60 bearing the liquid injector 6 by itself. The liquid injection plate 60 can be positioned to rotate along an axle 61 mounted on the top part of the base 58 such that the plate can take at least a first position at which the injector is placed away from the liquid inlet opening of the capsule and a second position at which the injected is engaged in opening of the liquid inlet 24. The first position is illustrated on FIG. 17 whereas the second position is illustrated in FIG. 18. The injection plate moves from the first position to the second position, and vice versa, by a cam mechanism 62 which is also mounted in rotation along a second axle 63 on the base. Similarly, a gas injector 7 is provided which can take a first position where it maintained away from the gas inlet of the capsule (FIG. 19) and a second position where it is engaged in opening of the gas inlet (FIG. 20). Again the change from first to second position of the gas injector 7 is controlled by the cam mechanism 62. In an advantageous manner, the cam mechanism 62 is common to control both the positions of the liquid and gas injectors in such a manner that the gas injector moves from its first to second position at a time the liquid injector has already moved from first to second position. The cam mechanism 62 in particular comprise at least one first cam portion 64 acting on the injection plate and at least one second cam portion 65 acting on the gas injector. The two cam portions are linked to the same cam mechanism so that they always act on their respective injectors in a coordinated manner. FIGS. 17 and 18 show the first cam portion 64 acting to change the position of the liquid injector 6 by pushing the plate 60. The cam portion 64 forming an eccentric surface relative to axle 63 which pushes the plate 60 downwards in direction of the capsule. It should be noted that sealing means such as an O-ring (not shown) may be associated to the injection plate for locally creating a liquid seal around the liquid inlet. FIGS. 19 and 20 show the second cam portion 65 also forming an eccentric surface pushing on the gas injector 7 in direction of the gas inlet. For clarity, the device does not show all the detail, in particular, the elastic return means for replacing the liquid injection plate in its first position and similar means for replacing the gas injector in its first position. Such elastic return means can be in the form of springs or equivalents.

In a different mode, the filter unit 18 can separate from the capsule and be a disposable part of the fluid supply device.

What is claimed is:

1. A capsule for the preparation of a nutritional product in a device adapted to supply liquid into the capsule, the capsule comprising:
   a body comprising a side wall that delimits the body into a filter receiving seat and a compartment;
   the compartment containing nutritional ingredients for the preparation of the nutritional product in combination with the supplied liquid;
   a filter unit adapted for removing contaminants contained in the liquid, the filter unit comprising a microporous membrane encased in a rigid casing, the microporous membrane comprising a filtering surface, the casing comprising an inlet wall and an outlet wall, the casing is positioned in the filter receiving seat; and the filter-receiving seat is positioned upstream of the compartment and is formed by an extension portion of the body that extends radially outward from the side wall of the body such that the seat is laterally offset from the compartment and at least 60% of the filtering surface of the microporous membrane does not overlap the compartment;

a top membrane that closes and seals the compartment and seals the filter unit in the filter-receiving seat;

a selectively openable gas inlet formed in the inlet wall to allow gas introduction from outside the capsule into the compartment containing the nutritional ingredients without passing through the microporous membrane;

an outlet nozzle communicating with the compartment and formed in the outlet wall; and a liquid conduit in the filter unit and placed upstream of the outlet nozzle and downstream of the microporous membrane, wherein the gas inlet has a defined size, in open configuration, and is provided in a the inlet wall of the casing, and the gas inlet merges with the liquid conduit.

2. The capsule according to claim 1, wherein the gas inlet is sealed by a puncturable membrane or comprises a breakable closing portion.

3. The capsule according to claim 1, wherein the microporous membrane has a cross section, taken along a transversal plane of the capsule, which is smaller than the cross section, in the transversal plane, of the compartment containing the ingredients.

4. The capsule according to claim 1, wherein the inlet wall and the outlet wall of the casing form an inner compartment in which the microporous membrane is inserted, and the microporous membrane has a circumference at which the microporous membrane is liquid imperviously sealed to the casing to force liquid entering the inlet wall to traverse the microporous membrane before reaching the outlet wall.

5. The capsule according to claim 4, wherein the casing is formed of two half-casings which are connected or joined together and with the microporous membrane at its circumference.

6. A method of delivering a nutritional product using the capsule according to claim 1, the method comprises supplying a liquid to the compartment to form the nutritional product using the nutritional ingredients within the compartment, and releasing the nutritional product through the outlet nozzle of the capsule according to claim 1, wherein prior to the supplying step, filtering the liquid through the microporous membrane to remove contaminants contained in the liquid and subsequently supplying a gas into the compartment of the capsule to assist in the removal of liquid from the capsule.

7. The method according to claim 6, wherein the gas is supplied into the compartment from the exterior of the capsule through the gas inlet without passing through the microporous membrane.

8. The method according to claim 7, wherein the gas is supplied upstream of the outlet nozzle communicating with the compartment.

9. The method according to claim 6, wherein the supplying of the gas is carried out at least until the compartment of the capsule is emptied from liquid.

10. In combination, a capsule and a device for delivering a nutritional composition from a capsule, the combination comprising the capsule according to claim 1, and a device for supplying liquid to the capsule for preparation of the nutritional composition; the device comprising a liquid injector, and a gas injector for injecting gas into the capsule which is distinct and spatially distant from the liquid injector so that gas is supplied in the capsule through the gas inlet of the capsule which is spatially distant from a liquid inlet of the capsule to assist in the removal of liquid from the capsule.

11. The capsule of claim 1, wherein the microporous membrane has a pore size of less than 0.4 microns, a thickness of less than 500 microns, and is made of polyethersulfone, cellulose acetate, cellulose nitrate, polyamide or combinations thereof.

12. The capsule of claim 1, wherein the capsule comprises a bottom wall that includes a nutritional production outlet conduit opposite to the top membrane, and wherein the gas inlet comprises an opening through the inlet wall that intersects with the liquid conduit and is arranged so that gas entering the capsule body will bypass the microporous membrane, and further wherein both a liquid inlet and the gas inlet are closed by the top membrane.

13. The capsule of claim 12, wherein the liquid and gas inlets are selectively openable when the top membrane is perforated at the liquid and gas inlets, respectively, with the top membrane being sealed separately around the liquid inlet and gas inlet by seals.

14. The capsule of claim 1 wherein the casing is formed of two parts which are welded or clipped together while pinching the microporous membrane at a circumference of the microporous membrane, the compartment comprises a compartment opening, the filtering surface is smaller than the compartment opening, and the side wall of the body has a top edge that defines the compartment opening, the side wall including weakened lines oriented to promote compression of the body of the capsule in an axial direction.

15. The capsule according to claim 4, wherein the inlet wall of the casing comprises a liquid inlet and the gas inlet at different positions on the inlet wall relative to each other, the liquid inlet emerges into a first side of the inner compartment in which the microporous membrane is inserted, the liquid conduit extends from a second side of the inner compartment to the outlet nozzle, and the microporous membrane is located between the first and second sides of the inner compartment.

16. The capsule according to claim 15, wherein the gas inlet merges with the liquid conduit at a point between where the liquid conduit begins at the second side of the inner compartment of the casing and where the liquid conduit ends at the outlet nozzle.

* * * * *